United States Patent [19]

Martell et al.

[11] Patent Number: 4,955,804

[45] Date of Patent: Sep. 11, 1990

[54] TOOL FOR MOLDING PLASTIC ARTICLES

[75] Inventors: William A. Martell, Sterling Heights, Mich.; Colin R. Brown, Grange, Australia

[73] Assignee: General Motors Corporation, Detroit, Mich.

[21] Appl. No.: 367,916

[22] Filed: Jun. 19, 1989

[51] Int. Cl.⁵ .................. B29C 45/20; B29C 45/73
[52] U.S. Cl. ............................. 425/548; 219/421;
264/328.15; 264/328.16; 425/549; 425/552
[58] Field of Search ............... 264/328.14, 328.15,
264/328.16; 425/547, 548, 549, 552; 219/421,
523

[56] References Cited

U.S. PATENT DOCUMENTS 4,687,613 8/1987 Tsutsumi ........................ 425/547

OTHER PUBLICATIONS

Modern Plastics Encyclopedia, 1984–1985, p. 235, "Fluid–Circulating Temperature Control" by J. J. Fitzgerald.

Primary Examiner—Jay H. Woo
Assistant Examiner—Timothy W. Heitbrink
Attorney, Agent, or Firm—R. W. Tung

[57] ABSTRACT

This mold tooling has a hot drop assembly operatively mounted in a bore formed therein which opens to a mold face. Heated plastic material is fed to a feed tube of the hot drop assembly and this material is heated at a temperature higher than the working temperature of the mold during its transit the face of the tool by electrically energized heater bands encircling the feed tube. The space between the heater bands and bore wall accommodates tubing through which a flow of chilled cooling air is injected. The temperature and amount of the cooling air may be regulated to match the heat energy discharged by the heating bands into the bore and to the body of the tooling. The flow of cooling air transmits heat energy out of the bore so that heat sensitive plastic materials being molded is not degraded by hot drop assembly heat energy that otherwise would be conducted by the tool body to the tool face.

5 Claims, 1 Drawing Sheet

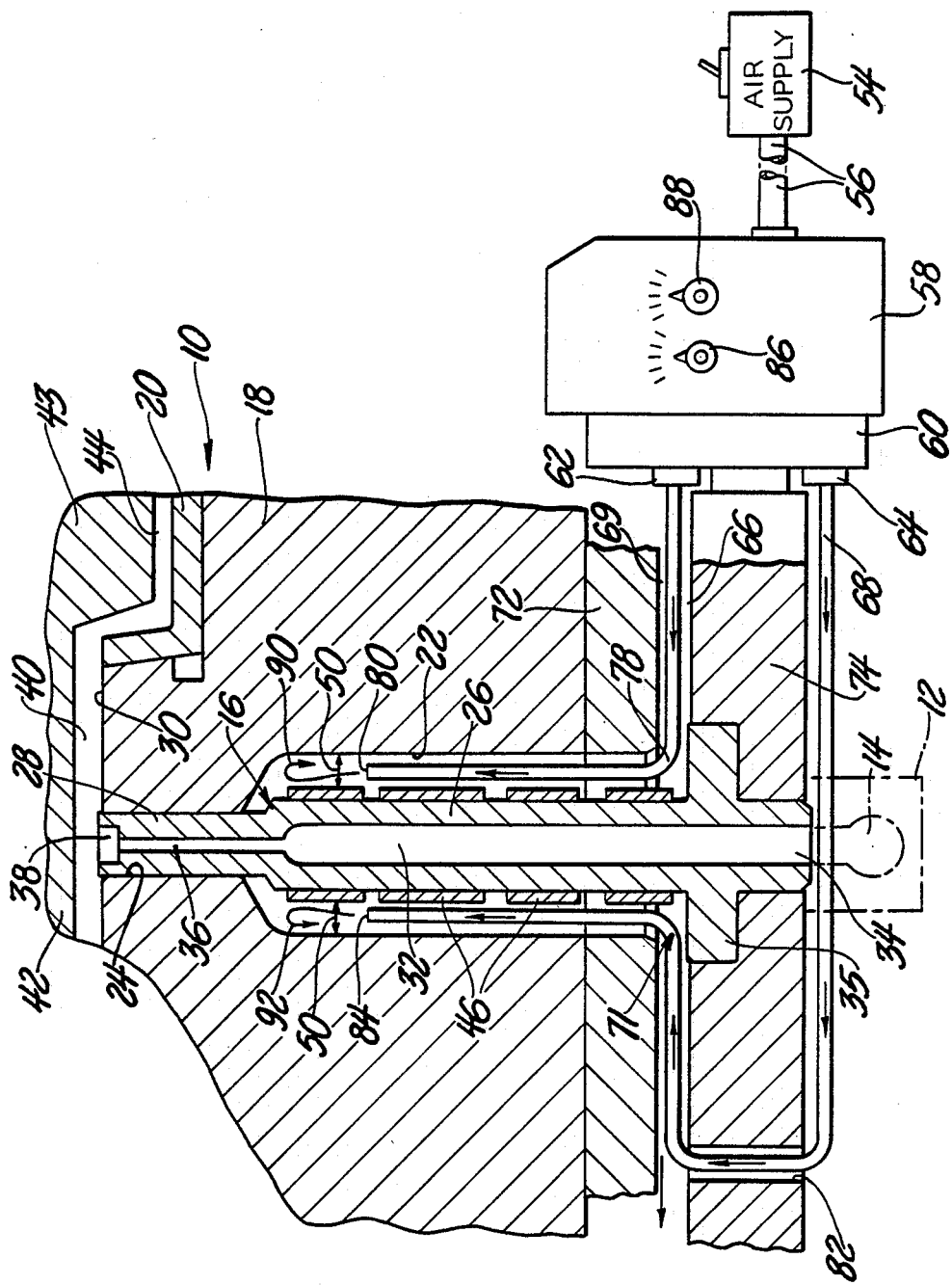

TOOL FOR MOLDING PLASTIC ARTICLES

FIELD OF INVENTION

This invention relates to molding of plastics and more particularly to new and improved tools with internal fluid cooling for molding plastic articles from charges of hot plastic materials fed to the tooling.

BACKGROUND OF THE INVENTION

Prior to the present invention tooling for molding plastic articles from a heated supply of plastic material generally requires a cooling system so that finally finished articles are produced without degradation from heat build up at the mold face. For example drilled lines are provided in injection molding tooling around the hot drop assembly fixed within the tooling so that cooling liquids flowing therethrough can transfer the high heat energy transmitted from the hot drop assembly to the tool away from the face of the tool. With such cooling the part being molded will not be damaged or destroyed by migration of heat to the tool face from the hot drop assembly While such prior art cooling systems are effective they require extensive, labor-intensive cross-drilling of liquid flow paths generally in a rectilinear pattern that require plugging at drill entrance holes. In such cooling systems liquids such as water can be used as the heat transfer agent which may have impurities that build up and restrict or block and such paths. The cooling water may also freeze and expand in cold weather during tool storage or shipment or during power outages to damage or destroy the mold. Cooling liquids are also susceptible to leaking through the mold and may cause marginal performance or damage of the tool or damage to the molded product. With the above in mind the present invention provides a new and improved molding tool for molding articles from heated plastic material featuring improved cooling of the tool to prevent the degradation of the part molded.

SUMMARY OF THE INVENTION

The preferred embodiment of this invention employes a hot drop assembly mounted within a bore in injection mold tooling to raise the temperature of the molten plastic to prevent premature hardening of the plastics transiting therethrough before entering the working face of the mold. Generally, this hot drop assembly has heater elements extending around a feeder tube that conducts the heated charges of plastic material from a hot runner system through the tool body and to the mold space defined by the tool body used to retain the mold core and mold cavity.

With this invention a new and improved cooling system is provided which eliminates the use of the bored liquid cooling passages of the prior art and the requirement for cooling liquids for heat transfer. In the present invention the hot drop assembly is radially spaced from the walls of the tool that define the bore for the hot drop assembly and the space is advantageously used by new and improved air cooling system and structure in which chilled air is injected deeply within the mold core closely adjacent to the hot drop assembly. This cooling air transfers the radiating high heat energy from the hot drop assembly and directly from tool body areas surrounding the hot drop assembly so that such heat energy will not migrate through the tool body to the face of the mold to degrade or destroy the article being molded.

Accordingly, it is an object of this invention to provide new and improved tooling for molding plastic articles by injecting a flow of chilled cooling air to the areas of the mold tooling surrounding a hot drop assembly to inhibit the conduction of heat energy from the hot drop assembly by the tool body to the mold face thereof.

It is another object of the invention to provide a new and improved forced air cooling system for injection mold hot drop cavities in a wide range of tools so that internal passages for transmittal of cooling liquids are eliminated These and other features, objects, advantages of the present invention will become more apparent from the following detailed description and drawing in which:

DESCRIPTION OF THE DRAWING

The FIGURE is a diagrammatic illustration with parts in cross section of a injection mold tooling with a hot drop assembly with a cooling system provided therefor.

DETAILED DESCRIPTION OF THE DRAWING

Referring now in greater detail to the drawing there is shown in the FIGURE a two plate mold 10 assembled for operating at a predetermined temperature range for molding articles from molten plastics material supplied thereto from an injection molding machine through a conventional hot runner system 12. The hot runner system further heats the plastics material being conducted therethrough and directs this material through a discharge opening 14 into a hot drop assembly 16, that is, operatively mounted within a tool 18 of the assembled mold 10. The tool 18 includes a mold cavity 20 which may be a separate part or integral with the face of the tool. As shown, the hot drop assembly extends in an opening through tool 18 formed by bore 22 and counter bore 24. The hot drop assembly 16 includes a feeder tube with a cylindrical main body 26 and a reduced diameter nozzle 28 that fits within the counter bore 24 and extends to the face 30 of the tool.

That feeder tube of the hot drop assembly has a longitudinally extending feed passage 32 therethrough with an entrance 34 in a flanged lower end 35 communicating with the discharge opening 14 of the hot runner system and with a reduced diameter ejector passage 36 which terminates in an annular opening 38 for discharging the molten plastics material being fed through the feed passage. The discharge opening 38 communicates with a channel 40 formed in the face 30 of cavity retainer tool 18 and in the face of a core retainer tool 42 of mold 10 that has a core 43 separate or integral with the tool that mates with the cavity 20 to define a mold space 44 therebetween for receiving the molten plastics and for shaping the article when the plastics material cools and solidifies.

As illustrated, the large diameter portion of the feeder tube is encircled with heater bands 46 which are energized through an electrical control system not illustrated. These heater bands operate in a temperature range significantly higher than mold 10 to prevent "freeze up" of the material while being injected into the mold space. The heater bands 46 are radially spaced from the annular wall defining the bore 22. This generally cylindrical space generally indicated at 50 is in usual practice a dead space to provide insulation for reducing the transfer of heat energy from the energized heater bands to the wall of bore 22 and the body of tool 18 and the subsequent conduction of this heat energy to tool face 30. This insulation and the water cooling passages in many molding tools accordingly assists in preventing heat sensitive plastics articles in the mold from being damaged or destroyed by the high heat energy of the heater bands required to keep the molten plastics material flowing through the hot drop assembly.

The present invention importantly utilizes space 50 with greater effectiveness to improve the cooling of the core space 50 and tool 18 by providing for efficient heat transfer deep within the bore for transmittal of heat from the space 50 and from areas of the tool body around core 22. In accordance with a preferred embodiment of this invention there is a pressure regulated supply of air from a compressor 54 or other source which is fed through line 56 to an air chiller 58 for lowering the temperature of air supplied thereto.

The air chiller has a manifold 60 with outlets 62,64 from which copper air transmitting chill pipes 66 and 68 respectively extend. From outlet 62 chill pipe 66 routs in a passage 69 between a mold base plate 72 that supports cavity retainer tool 18 and a base plate 74 that supports the flanged end 35 of the hot drop assembly, manifold 60 and the chiller 58. Pipe 66 makes an angular bend at 78 into bore 22 and terminates in an open air end 80 deep within the bore 22 for discharging chilled air therein. Chill pipe 68 extends beneath the manifold mounting plate 74 and is routed upwardly through a vertical opening 82 therethrough and into a reverse bend to extend in passage 69 back toward the chiller. At the hot drop assembly the chiller pipe 68 bends upwardly through the opening 71 in the mold base plate and into the bore 22 to a terminal end 84 that also opens deep inside the bore 22 to deliver cooling air 90, 92 within the mold for the internal cooling thereof. The chiller 58 has manually operable controls 86,88 which control and vary the temperature of the cooling air and the volumeric output thereof.

This forced cooling air 90, 92 will flow over the walls of bore 50 in paths leading to the bore opening and exhaust out of the mold in the passage 69 between the mold base and the manifold mounting base to transmit heat energy from tool 18. This importantly lowers the temperature of the tool particularly around the hot drop assembly to eliminate the need for an internal liquid cooling systems and effectively removes the high heat energy near its source. This heat energy which would otherwise be transmitted from the heater coils of the hot drop assembly into the tool body and then conducted by the tool body 18 to face 30 thereof. Accordingly the high heat energy of the hot drop assembly which may operate in a temperature range up to 500° F. will not migrate to the face of the tool which operates in a temperature range up to 200° F. With this invention, this heat energy will not degradate the molded plastic articles while solidifying in the mold space. This cooling arrangement is such that the temperature and volume output of the chiller can be controlled through the manual controls to optimize the cooling of the tool body 18 and usage of energy. This cooling arrangement is also adaptable to tooling made from a wide range of materials such as Zinc alloy, P20 Steel, epoxy resins and applies to a wide range of injection type tool that inject molding materials to a mold face.

While a preferred embodiment of the present invention has been shown and described, other embodiments will be apparent to those skilled in the art. Accordingly, the invention is defined by the following claims.

We claim:

1. A mold for molding objects from a heated charge of plastic material fed thereto comprising a mold body, one side of said mold body defining a mold face, a passage in said mold body extended into said face, said passage bounded by an internal wall within said body, a hot drop assembly operatively mounted within said passage, said hot drop assembly conducting and heating said charge of plastic material fed thereto for delivery to said face of said mold, said hot drop assembly having an elongated injector body being mounted within said passage and having an opening therethrough for said charge of plastic material, heater means associated with said injector body for further heating of the heated charge of plastic material within said hot drop assembly, said hot drop assembly being spaced at least in part from said internal wall and gas cooing means for forcing a flow of cooling gas directly between said hot drop assembly and said internal wall to effect internal cooling of said mold by transferring heat energy from said opening and from areas of said mold body surround said passage to an exhaust passage to thereby lower the operating temperature of said mold so that high heat energy will not be conducted by said mold to said face and damage an object being molded.

2. A mold for molding objects from a heated charge of plastic material comprising a mold body, one side of said mold body defining at least in part a mold face, an opening in said mold face, said opening bounded by an internal wall within said body, a hot drop assembly operatively mounted within said opening said hot drop assembly conducting and heating said charge of plastic material fed thereto for delivery to said mold face, said hot drop assembly having an elongated charge conducting injector body being mounted within said opening for transmitting said heated plastic material fed thereto to said mold face, heater means associated with said injector body to effect the heating of said injector body and the heating of the charge of plastic material fed therethrough, said heater element of said hot drop assembly being spaced at least in part from said wall means, and means for supplying a flow of cooling air directly to said opening and between said hot drop assembly and said internal wall to effect internal cooling of said mold and a transfer of heat energy from said tool body to an exhaust passage.

3. The tool defined by claim 2 wherein an air chiller is provided for supplying cooling air to said opening and tubular feed means for transmitting said cooling air from said chiller to said opening.

4. A tool operable in a first temperature range for molding plastic articles from a heated plastic material fed thereto comprising a tool body having a mold face, bore means formed in said body defining by an internal wall therein which opens to said mold face, elongated feed tube means for feeding molten plastic material to said face operatively mounted in said bore and having a least a portion thereof spaced from said wall means, energizible heater means associated with said feed tube means and spaced from said wall means for heating the plastic material within said feed tube means above said first temperature range and as the plastic material is forced therethrough to the face of said tool, pneumatic cooling means for injecting a flow of cooling gas to said bore means to effect a transfer of heat energy radiating from said heater means to said cooling means to thereby limit and reduce heat energy transferred from said heater means to the said mold face by conduction of heat energy through said mold body.

5. A tool operable in a first range of temperatures for molding articles form a heated plastic material fed thereto comprising a mold body having a mold face, a bore formed in said body defined by an internal wall therein which has an inlet in said mold body and which opens to said mold face, feed tube means for feeding said heated plastic material to said face operatively mounted in said bore and having at least a portion thereof spaced from said wall means, energizible heater means associated with said feed tube means and spaced from said internal wall for heating the plastic material within said feed tube means to a second range of temperatures higher than said first range of temperatures and as the plastic material is forced through said tube means to said face of said tool, air chiller means for supplying a flow of cooling air to said bore to effect a transfer of heat energy from said heater means to said flow of cooling air to thereby limit and reduce heat energy transferred from said heater means to the said mold face by conduction of heat energy through said mold body.

* * * * *